(12) United States Patent
Croak, Jr. et al.

(10) Patent No.: US 9,042,539 B2
(45) Date of Patent: *May 26, 2015

(54) METHOD AND APPARATUS FOR SENDING ALERTS TO INTERNET PROTOCOL PHONES

(71) Applicant: AT&T Intellectual Property II, L.P., Atlanta, GA (US)

(72) Inventors: Marian Croak, Jr., Fair Haven, NJ (US); Hossein Eslambolchi, San Diego, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 165 days.

This patent is subject to a terminal disclaimer.

(21) Appl. No.: 13/707,393

(22) Filed: Dec. 6, 2012

(65) Prior Publication Data
US 2013/0094497 A1    Apr. 18, 2013

Related U.S. Application Data

(63) Continuation of application No. 12/647,482, filed on Dec. 26, 2009, now Pat. No. 8,358,770, which is a continuation of application No. 11/025,400, filed on Dec. 29, 2004, now Pat. No. 7,664,252.

(51) Int. Cl.
| | | |
|---|---|---|
| H04M 3/00 | (2006.01) | |
| H04M 1/253 | (2006.01) | |
| H04M 3/46 | (2006.01) | |
| H04M 1/56 | (2006.01) | |
| H04M 3/42 | (2006.01) | |

(52) U.S. Cl.
CPC .............. *H04M 1/2535* (2013.01); *H04M 3/46* (2013.01); *H04M 3/465* (2013.01); *H04M 1/56* (2013.01); *H04M 3/42042* (2013.01); *H04M 3/42365* (2013.01)

(58) Field of Classification Search
CPC .......................... H04M 3/42365; H04M 3/465
USPC .............. 379/252, 179, 164, 142.07; 370/352
See application file for complete search history.

(56) References Cited

U.S. PATENT DOCUMENTS

| | | | |
|---|---|---|---|
| 7,664,252 B1 | 2/2010 | Croak et al. | |
| 8,358,770 B2 | 1/2013 | Croak et al. | |
| 2002/0176404 A1 | 11/2002 | Girard | |
| 2006/0067302 A1 | 3/2006 | Wengrovitz et al. | |
| 2006/0072546 A1 | 4/2006 | Chen | |

*Primary Examiner* — Creighton Smith

(57) ABSTRACT

The present invention enables an alert message and the display of calling party identity on all on-hook phones associated with an extension sharing the same phone number, when one phone is off-hook and in use. In one exemplary embodiment, this capability enables all other members of a household to receive information regarding an incoming call even when one phone is in use by another member.

20 Claims, 5 Drawing Sheets

METHOD AND APPARATUS FOR SENDING ALERTS TO INTERNET PROTOCOL PHONES

This application is a continuation of U.S. patent application Ser. No. 12/647,482, filed Dec. 26, 2009, which is currently allowed, and is a continuation of U.S. patent application Ser. No. 11/025,400, filed Dec. 29, 2004, now U.S. Pat. No. 7,664,252, both of which are incorporated herein by reference in their entirety.

The present invention relates generally to communication networks and, more particularly, to a method and apparatus for sending alerts to on-hook residential Internet Protocol (IP) phones in packet switched networks, e.g., Voice over Internet Protocol (VoIP) networks.

BACKGROUND OF THE INVENTION

Occasionally, in households with multiple phones on one extension sharing the same phone number, one phone is in use when a new call arrives. The person using the phone is the only one in the household to receive the call-waiting indication and view the calling party caller identity (ID) information. The rest of the phones in the household that are on-hook will remain inactive and will receive and display no incoming call alerts or caller ID information. Broadly defined, an on-hook phone is a phone that is not being used by a user and an off-hook phone is a phone that is being used by a user.

Therefore, a need exists for a method and apparatus for sending alerts to on-hook Internet Protocol (IP) phones in packet-switched networks, e.g., VoIP networks.

SUMMARY OF THE INVENTION

In one embodiment, the present invention enables an alert message and the display of calling party identity on all on-hook phones associated with an extension sharing the same phone number, when one phone is off-hook and in use. This capability enables all other members of a household to receive information regarding an incoming call even when one phone is in use by another member.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
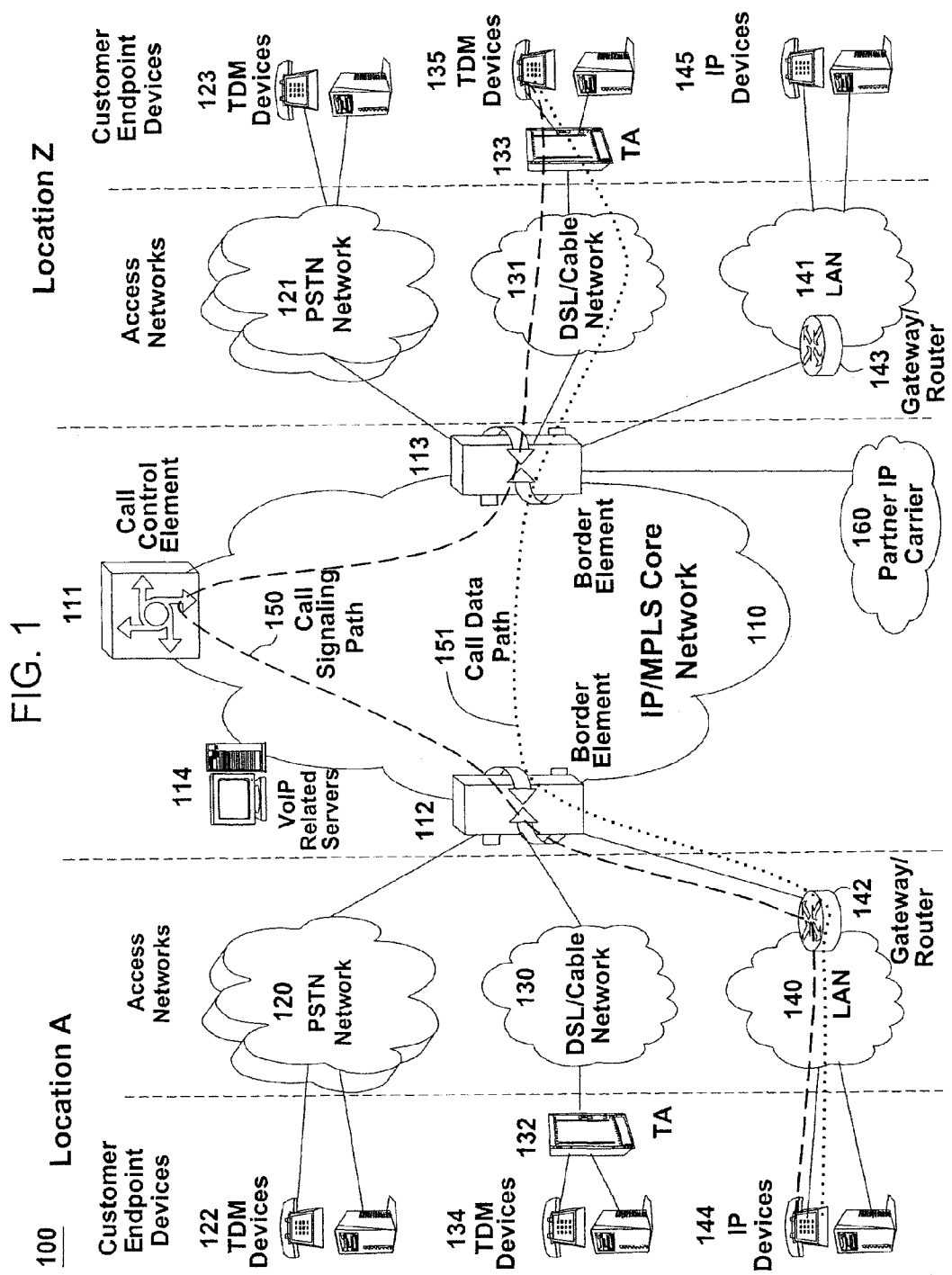
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Occasionally, in households with multiple phones on one extension sharing the same phone number, one phone is in use when a new call arrives. The person using the phone is the only one in the household to receive the call-waiting indication and view the calling party caller identity (ID) information. The rest of the phones in the household that are on-hook will remain inactive and will receive and display no incoming call alerts or caller ID information. Broadly defined, an on-hook phone is a phone that is not being used by a user and an off-hook phone is a phone that is being used by a user.

To address this criticality, the present invention enables an alert message and the display of calling party identity on all on-hook phones associated with an extension sharing the same phone number, when one phone is off-hook and in use. This capability enables all other members of a household to receive information regarding an incoming call even when one phone is in use by another member.

Figure 2:
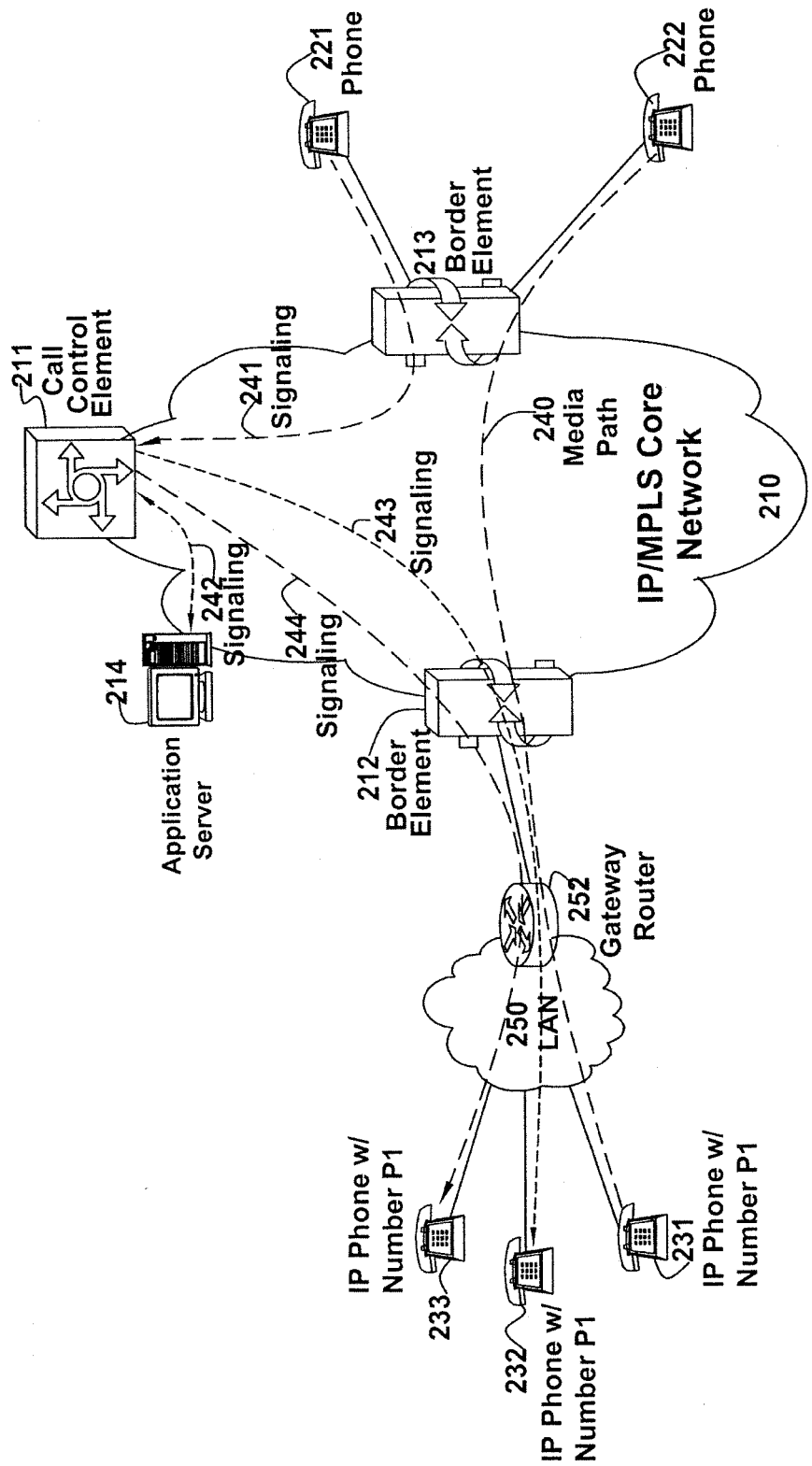
FIG. 2 illustrates an example of sending alerts to on-hook residential Internet Protocol (IP) phones in a VoIP network of the present invention.

FIG. 2 illustrates an example of sending alerts to on-hook Internet Protocol (IP) phones in a packet-switched network, e.g., a VoIP network. In FIG. 2, IP phones 231, 232, and 233 share the same phone number, P1, and are all associated with the same phone number. IP phone 231 is in use by a user and an ongoing call is connecting phone 222 and IP phone 231 using the VoIP network 200 with media path 240 via LAN 250 with gateway/router 252, BE 212, and BE 213. Another user using phone 221 makes a call to the aforementioned phone number using the called party phone number P1. CCE 211 receives the call setup message 241 from phone 221 via BE 213.

CCE 211 finds out that the called number is already in use and one of the phones, IP phone 231, is off-hook supporting an ongoing call. CCE 211 finds out from the Application Server (AS) 214, using flow 242, that the subscriber of the called party phone number P1 has subscribed to the on-hook alert message to IP phone service feature and further finds out the on-hook alert message to IP phone service feature has been enabled by the subscriber. Note that a subscriber can send a predefined Dual Tone Multiple Frequency (DTMF) signal to the network to enable or disable the on-hook alert message to residential IP phone service feature anytime when the phone line is not in use. CCE 211 then provides the normal call processing by sending the call waiting indication and the caller ID information to IP phone 231 which is off-hook. In addition, CCE 211 also sends signaling messages to IP phones 232 and 233, using flows 243 and 244 respectively, which are on-hook, so that an alert message and the incoming caller ID information can be displayed on these on-hook IP phones. Upon receiving the alert signaling message from the network, IP phones 232 and 233 displays the incoming call alert message and caller ID information to inform other users in the household the occurrence of such an incoming call. The alert message can be in various formats including displaying a text message on the screen of the IP phones, activating a flashing light indicator, e.g., an LED on the IP phones or activating a beeping sound on the on-hook IP phones.

Figure 3:
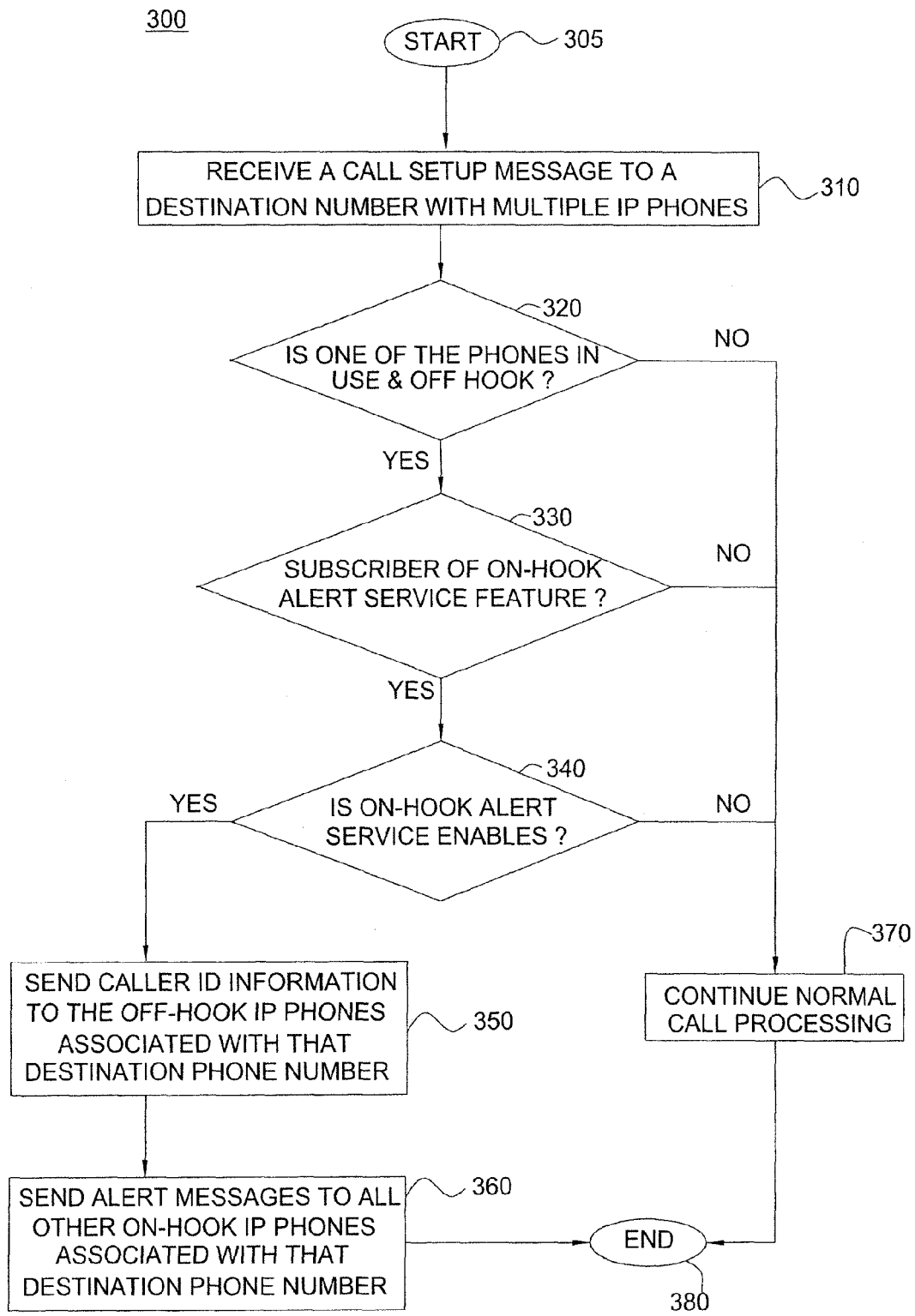
FIG. 3 illustrates a flowchart of a method for sending alerts to on-hook residential Internet Protocol (IP) phones in a VoIP network of the present invention.

FIG. 3 illustrates a flowchart of a method for sending alerts to on-hook Internet Protocol (IP) phones, e.g., by the CCE in a VoIP network. Method 300 starts in step 305 and proceeds to step 310.

In step 310, the method receives a call setup message to a called party phone number with multiple IP phones associated with that same phone number. In step 320, the method checks if the number is already in use with another calling party and one of the IP phones is off-hook. If the number is already in use with another calling party and one of the IP phones is off-hook, the method proceeds to step 330; otherwise, the method proceeds to step 370. In step 330, the method checks if the phone number has subscribed to the on-hook alert message to IP phone service feature. If the phone number has subscribed to the on-hook alert message to IP phone service feature, the method proceeds to step 340; otherwise, the method proceeds to step 370. In step 340, the method checks if the on-hook alert message to IP phone service feature has been enabled. If the on-hook alert message to IP phone service feature is enabled, the method proceeds to step 350; otherwise, the method proceeds to step 370. In step 350, the method sends the regular call waiting indication and the caller ID information to the IP phone that is in use and off-hook. In step 360, the method sends signaling messages to all off-hook phones having the same phone number to provide an alert message and the caller ID of the incoming call. In step 370, the method provides regular call processing for the incoming call. The method ends in step 380.

Figure 4:
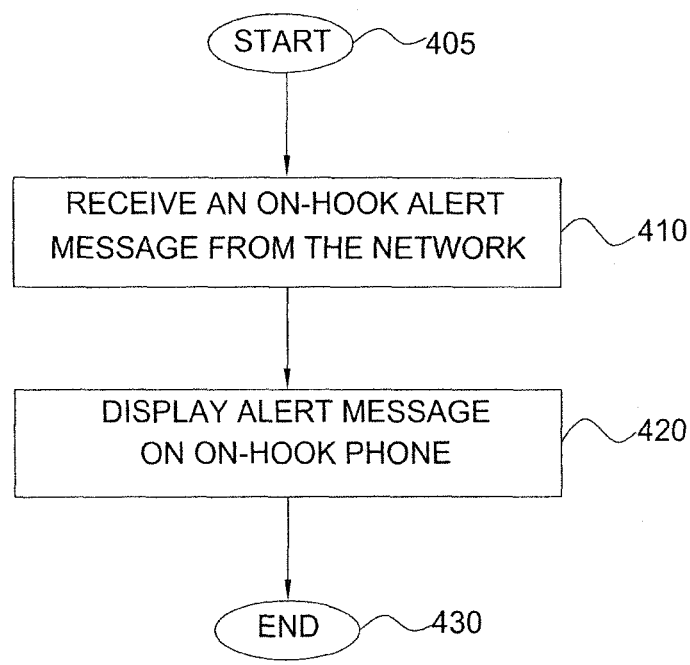
FIG. 4 illustrates a flowchart of a method for receiving alerts by an on-hook residential Internet Protocol (IP) phones of the present invention.

FIG. 4 illustrates a flowchart of a method for receiving alerts by an on-hook residential Internet Protocol (IP) phone. Method 400 starts in step 405 and proceeds to step 410.

In step 410, the method receives an on-hook alert message from the network. In step 420, the method displays the incoming alert message and caller ID on the on-hook IP phone. The method ends in step 430.

Figure 5:
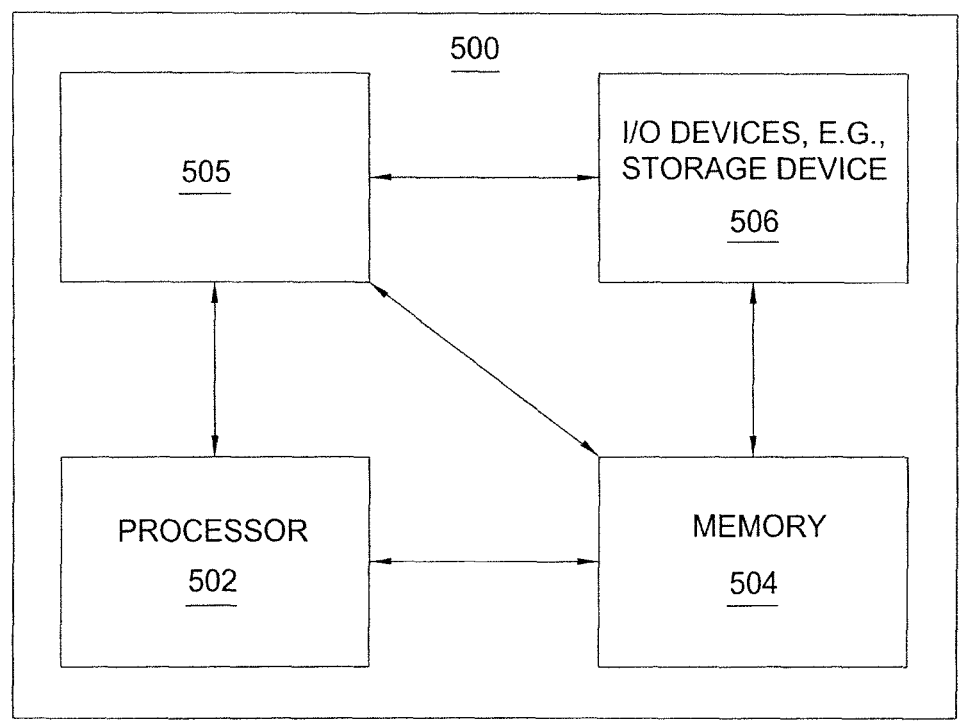
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), an on-hook alert message module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present on-hook alert message module or process 505 can be loaded into memory 504 and executed by processor 502 to implement the functions as discussed above. As such, the present on-hook alert message process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for receiving a signaling message via a communication network, comprising:
    receiving, by a processor of an internet protocol phone that is on-hook, the signaling message, when one of a plurality of internet protocol phones is off-hook, wherein the internet protocol phone is one of the plurality of internet protocol phones, wherein the plurality of internet protocol phones is all associated with a same phone number; and
    displaying, by the processor, the signaling message on the internet protocol phone that is on-hook.

2. The method of claim 1, wherein the communication network comprises a voice over internet protocol network.

3. The method of claim 1, wherein the same phone number has been registered to an on-hook alert message service for receiving the signaling message.

4. The method of claim 3, wherein the on-hook alert message service is enabled by a predefined dual tone multiple frequency signal.

5. The method of claim 3, wherein the on-hook alert message service is disabled by a predefined dual tone multiple frequency signal.

6. The method of claim 1, wherein the signaling message comprises:
    an incoming call alert; and
    a caller identity information.

7. The method of claim 6, wherein the incoming call alert comprises a text message.

8. A tangible computer-readable medium storing a plurality of instructions which, when executed by a processor of an internet protocol phone, cause the processor to perform operations for receiving a signaling message via a communication network, the operations comprising:
    receiving, by the internet protocol phone that is on-hook, the signaling message, when one of a plurality of internet protocol phones is off-hook, wherein the internet protocol phone is one of the plurality of Internet protocol phones, wherein the plurality of internet protocol phones is all associated with a same phone number; and
    displaying the signaling message on the internet protocol phone that is on-hook.

9. The tangible computer-readable medium of claim 8, wherein the communication network comprises a voice over internet protocol network.

10. The tangible computer-readable medium of claim 8, wherein the same phone number has been registered to an on-hook alert message service for receiving the signaling message.

11. The tangible computer-readable medium of claim 10, wherein the on-hook alert message service is enabled by a predefined dual tone multiple frequency signal.

12. The tangible computer-readable medium of claim 10, wherein the on-hook alert message service is disabled by a predefined dual tone multiple frequency signal.

13. The tangible computer-readable medium of claim 8, wherein the signaling message comprises:
    an incoming call alert; and
    a caller identity information.

14. The tangible computer-readable medium of claim 13, wherein the incoming call alert comprises a text message.

15. A system for receiving a signaling message via a communication network, comprising:
    an internet protocol phone for receiving the signaling message, wherein the internet protocol phone is on-hook and is one of a plurality of internet protocol phones, when one of the plurality of Internet protocol phones is off-hook, wherein the plurality of internet protocol phones is all associated with a same phone number; and
    a display, coupled to the internet protocol phone, for displaying the signaling message on the internet protocol phone that is on-hook.

16. The system of claim 15, wherein the communication network comprises a voice over internet protocol network.

17. The system of claim 15, wherein the same phone number has been registered to an on-hook alert message service for receiving the signaling message.

18. The system of claim 17,
    wherein the on-hook alert message service is enabled by a first predefined dual tone multiple frequency signal; and
    wherein the on-hook alert message service is disabled by a second predefined dual tone multiple frequency signal.

19. The system of claim 15, wherein the signaling message comprises:
    an incoming call alert; and
    a caller identity information.

20. The system of claim 19, wherein the incoming call alert comprises a text message.

* * * * *